(12) United States Patent
Okada

(10) Patent No.: US 9,661,155 B2
(45) Date of Patent: May 23, 2017

(54) IMAGE FORMING APPARATUS

(71) Applicant: RISO KAGAKU CORPORATION, Tokyo (JP)

(72) Inventor: Aya Okada, Ibaraki (JP)

(73) Assignee: RISO KAGAKU CORPORATION, Tokyo (JP)

(*) Notice: Subject to any disclaimer, the term of this patent is extended or adjusted under 35 U.S.C. 154(b) by 0 days.

(21) Appl. No.: 14/996,431

(22) Filed: Jan. 15, 2016

(65) Prior Publication Data
US 2016/0227049 A1 Aug. 4, 2016

(30) Foreign Application Priority Data

Jan. 29, 2015 (JP) .................................. 2015-015573

(51) Int. Cl.
| | | |
|---|---|---|
| *G06F 15/00* | (2006.01) | |
| *H04N 1/00* | (2006.01) | |
| *G03G 15/00* | (2006.01) | |
| *G06F 3/12* | (2006.01) | |
| *G06K 15/00* | (2006.01) | |

(52) U.S. Cl.
CPC ....... *H04N 1/00074* (2013.01); *G03G 15/502* (2013.01); *G03G 15/55* (2013.01); *G06F 3/1234* (2013.01); *G06K 15/408* (2013.01); *H04N 1/00037* (2013.01); *H04N 1/00084* (2013.01); *H04N 1/00477* (2013.01); *G03G 2215/00569* (2013.01); *H04N 2201/0094* (2013.01)

(58) Field of Classification Search
None
See application file for complete search history.

(56) References Cited

U.S. PATENT DOCUMENTS

| | | |
|---|---|---|
| 2002/0118383 A1 | 8/2002 | Kamiya |
| 2008/0065932 A1* | 3/2008 | Izumiya ................. G06F 11/22 714/40 |

(Continued)

FOREIGN PATENT DOCUMENTS

JP 2008-211662 A 9/2008

OTHER PUBLICATIONS

Search Report issued by European Patent Office (EPO) patent office in European Patent Office (EPO) Patent Application No. 16152205.7, dated Jun. 21, 2016.

*Primary Examiner* — Helen Q Zong
(74) *Attorney, Agent, or Firm* — Greenblum & Bernstein, P.L.C.

(57) ABSTRACT

An image forming apparatus includes: an error detector detecting an error occurring in the image forming apparatus; a storage storing pieces of error handling information and test modes in association with each other, each of the pieces of error handling information indicating a method of error handling for each of errors occurring in the image forming apparatus, the test modes to be executed during the error handling; and an error controller reads, from the storage, the piece of error handling information and one or more of the test modes corresponding to an error detected by the error detector, generates an error handling screen including the read piece of error handling information and a transition button for transition to a test mode list screen for displaying a list of the read one or more of the test modes, and displays the generated error handling screen on a display.

3 Claims, 8 Drawing Sheets

(56) References Cited

U.S. PATENT DOCUMENTS

2015/0249771 A1* 9/2015 Young .................... G06F 3/121
                                                                                      358/1.14
2016/0031578 A1   2/2016 Fujimoto

* cited by examiner

IMAGE FORMING APPARATUS

CROSS REFERENCE TO RELATED APPLICATION

This application is based upon and claims the benefit of priority from the prior Japanese Patent Application No. 2015-015573, filed on Jan. 29, 2015, the entire contents of which are incorporated herein by reference.

BACKGROUND

1. Technical Field

The disclosure relates to an image forming apparatus which reduces the time required to start error handling when an error occurs, by enabling easy identification of a test mode corresponding to the occurred error.

2. Related Art

When an error occurs, an image forming apparatus such as a printer or a facsimile displays information such as a location and a content of the error on a monitor of the image forming apparatus. Then, a user having noticed the display on the monitor calls a maintenance company, and a service man having received the call performs error handling.

However, such error handling requires quite a long time, because when an error occurs, the image forming apparatus always has to prompt the user to call the maintenance company, and let the service man perform the error handling. Japanese Patent Application Publication No. 2008-211662 (JP2008-211662A) proposes a method in which a monitor of an image forming apparatus presents user processing for handling an occurred error to a user by displaying the processing step by step.

For the image forming apparatus described in JP2008-211662A, handling methods classified by model type, error type, and status at the occurrence of an error are stored in advance in a repair database. When error notification information sent from the image forming apparatus is received, information indicating a handling method for the occurred error is extracted from the repair database based on model information, error information, and status information of the image forming apparatus which are included in the error notification information, and the extracted information is displayed on the monitor of the image forming apparatus.

SUMMARY

In the image forming apparatus described in JP2008-211662A, test modes are frequently used when an error occurs. In the test modes, operations of various sensors, actuators, and the like in the image forming apparatus are checked to identify the error.

However, since there are many and various test modes, search for a test mode to be used takes a long time.

In a recent image forming apparatus including functions of photocopying, FAX, scanner, and the like in addition to the printing function, in particular, the number of various error sensors, actuators, and the like has increased due to these various functions. As a result, the number of portions (parts, areas, and the like) to be fixed in the error handling has increased, and the number of the test modes has reached several thousands in some cases. Accordingly, when an error occurs, the service man or the user needs to find an appropriate test mode out of the several thousand test modes, and this takes quite a long time.

For example, even when the handling method based on the error information is displayed on the monitor of the image forming apparatus as in the image forming apparatus described above, searching of the test mode takes time, and a long time is required for the error handling. Moreover, an unskilled service man unfamiliar with the test modes cannot perform the error handling because the service man does not know which test mode to execute.

An object of the disclosure is to provide an image forming apparatus which can reduce the time required to start error handling when an error occurs, by enabling easy identification of a test mode corresponding to the occurred error.

An image forming apparatus which forms an image on a recording medium based on a print data in accordance with some embodiments includes: an error detector configured to detect an error occurring in the image forming apparatus; a storage configured to store pieces of error handling information and test modes in association with each other, each of the pieces of error handling information indicating a method of error handling for each of errors occurring in the image forming apparatus, the test modes to be executed during the error handling; and an error controller configured to read, from the storage, the piece of error handling information and one or more of the test modes corresponding to an error detected by the error detector, generate an error handling screen including the read piece of error handling information and a transition button for transition to a test mode list screen for displaying a list of the read one or more of the test modes, and display the generated error handling screen on a display.

In the configuration described above, when an error occurs, the error handling screen including the error handling method and the screen transition button which correspond to the occurred error is displayed on the display. Accordingly, a user, a service man, and the like can grasp the error handling method and can also perform error handling by selecting the screen transition button in the error handling screen with the screen transition button to transition to the test mode screen and identifying a test mode corresponding to the error.

The error handling information may include a flag indicating whether the error handling is executable only by a service man or by both the service man and a user. The error controller may be configured to: read, from the storage, the error handling information and the one or more of the test modes corresponding to the error detected by the error detector and display an ID input screen for inputting a user ID or a service man ID on the display; upon the flag included in the read error handling information indicating that the error handling is executable only by the service man and only upon an ID inputted into the ID input screen being the service man ID, generate the error handling screen based on the read error handling information and the read one or more of the test modes and display the generated error handling screen on the display; and upon the flag included in the read error handling information indicating that the error handling is executable by both the service man and the user and upon the ID inputted into the ID input screen being any of the user ID and the service man ID, generate the error handling screen based on the read error handling information and the read one or more of the test modes and display the generated error handling screen on the display.

In the configuration described above, the service man can easily identify a test mode corresponding to the occurred error out of many test modes by selecting the screen transition button in the error handling screen with the screen transition button, and perform the error handling.

Upon the flag included in the read error handling information indicating that the error handling is executable by both the service man and the user and upon failure of the error handling performed by an operation of the user referring to the error handling screen displayed on the display, the error controller may calculate a failure rate of the error handling and rewrite the flag of the error handling whose calculated failure rate exceeds a threshold, to the flag indicating that the error handling is executable only by the service man.

In the configuration described above, when the frequency of failure of error handling by the user is high in a situation where a flag set for the error handling indicates that the error handling is executable by both the service man and the user, the error handling is set to be executable only by the service man hereafter. As a result, the flag can be rewritten such that the error handling is efficiently executed, based on the failure rate of the error handling.

DETAILED DESCRIPTION

Figure 1:
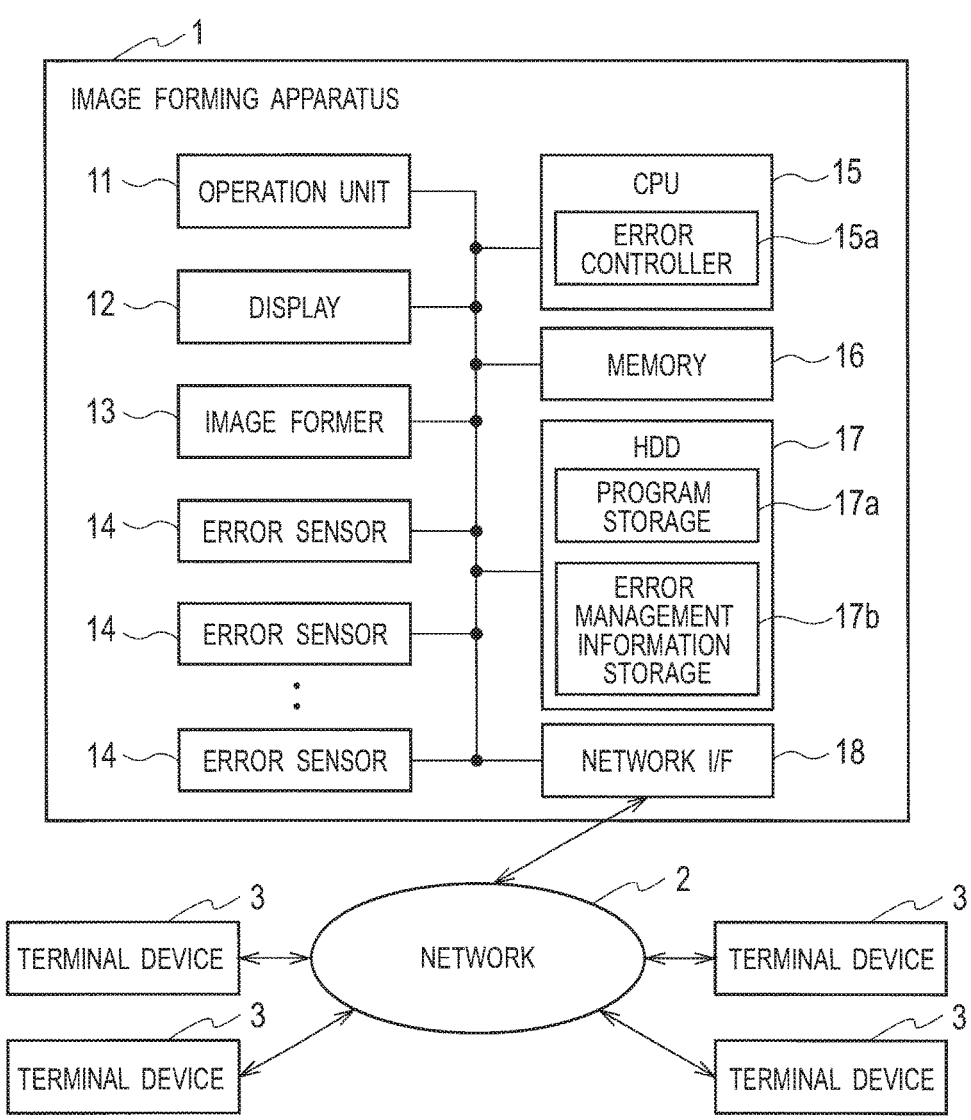
FIG. 1 is a block diagram illustrating a configuration of an image forming apparatus in Embodiment 1 of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

An image forming apparatus 1 in Embodiments 1 and 2 of the present invention is described in detail with reference to the drawings.

Embodiment 1

Configuration of Image Forming Apparatus 1

FIG. 1 is a block diagram illustrating a configuration of the image forming apparatus 1 in Embodiment 1.

As illustrated in FIG. 1, the image forming apparatus 1 is connected to terminal devices (clients) 3, 3, . . . of users via a network 2 such as a corporate network.

The image forming apparatus 1 includes an operation unit 11, a display 12, an image former 13, multiple error sensors 14, a CPU 15, a memory 16, a HDD (hard disk drive) 17, a network Interface (network I/F) 18, and the like.

The operation unit 11 is operated by a user, a service man, and the like and is provided with various operation switches such as a power switch. In the image forming apparatus 1, the operation unit 11 is used to input various types of data such as a user ID, a service man ID, and an error number and to input an error occurrence portion, error processing, and the like in a test mode search screen 12c to be described later.

The display 12 is used to display an operation status of the image forming apparatus 1, input data of the various operation switches in the operation unit 11, and the like. In Embodiment 1, the display 12 is used to display an error handling screen with a test mode screen transition button (hereafter, referred to as error handling screen with the transition button) 12a to be described later, a test mode screen 12b, the test mode search screen 12c, and the like, according to commands from the CPU 15.

The image former 13 performs image formation by performing operations such as printing image data based on a print job sent from any of the terminal devices 3, 3, . . . of the users via the network 2.

The multiple error sensors 14 function as error detectors and are provided in the image former 13, a not-illustrated sheet feeder, a not-illustrated sheet conveying route, a not-illustrated sheet discharger, and the like inside the image forming apparatus 1. The error sensors 14 detect various errors occurring inside the image forming apparatus 11.

The CPU 15 executes a program stored in the HDD (hard disk drive) 17 to control operations of the entire image forming apparatus 1 and to function as an error controller 15a as will be described later.

The memory 16 temporarily saves and stores various types of information and data processed by the CPU 15.

The HDD 17 has a program storage 17a and an error management information storage 17b. The program storage 17a stores programs such as the program which the CPU 15 executes to control the operations of the entire image forming apparatus 1 and to function as the error controller 15a to be described later. The error management information storage 17b stores error handling information indicating a method of error handling for each error and a test mode executed to perform the error handling, in association with each other as error related information. In the test mode, operations of components such as various sensors and actuators in the image forming apparatus 1 are checked to identify the error.

The network I/F 18 is connected to the terminal devices 3, 3, . . . via the network 2.

The terminal devices 3 are provided for the respective users and perform various types of information processing. Each of the terminal devices 3 is connected to the image forming apparatus 1 in Embodiment 1 via the network 2 and sends the print job to the image forming apparatus 1.

Operations of Image Forming Apparatus 1

Next, operations of the image forming apparatus 1 in Embodiment 1 configured as described above are described with reference to the drawings.

Figure 2A:
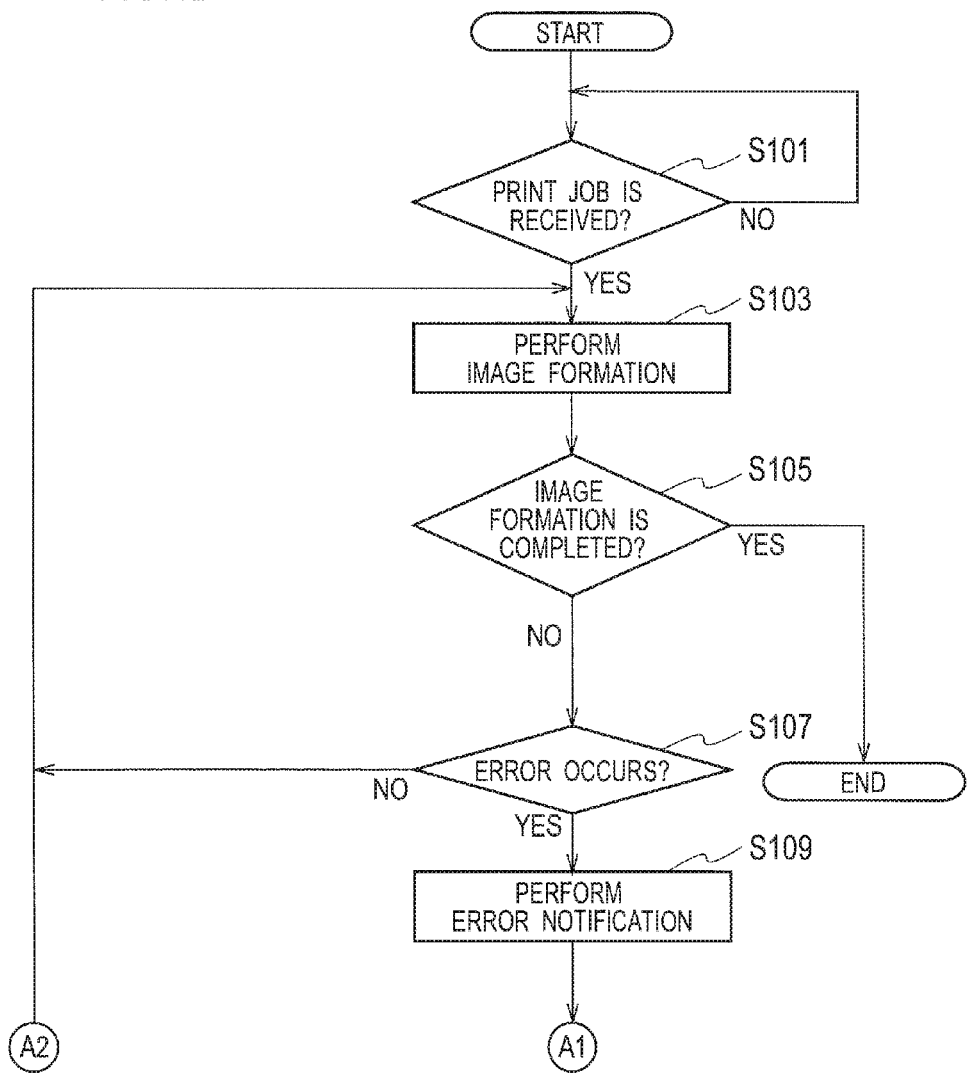
FIGS. 2A and 2B are flowcharts illustrating operations of the image forming apparatus in Embodiment 1.
Figure 2B:
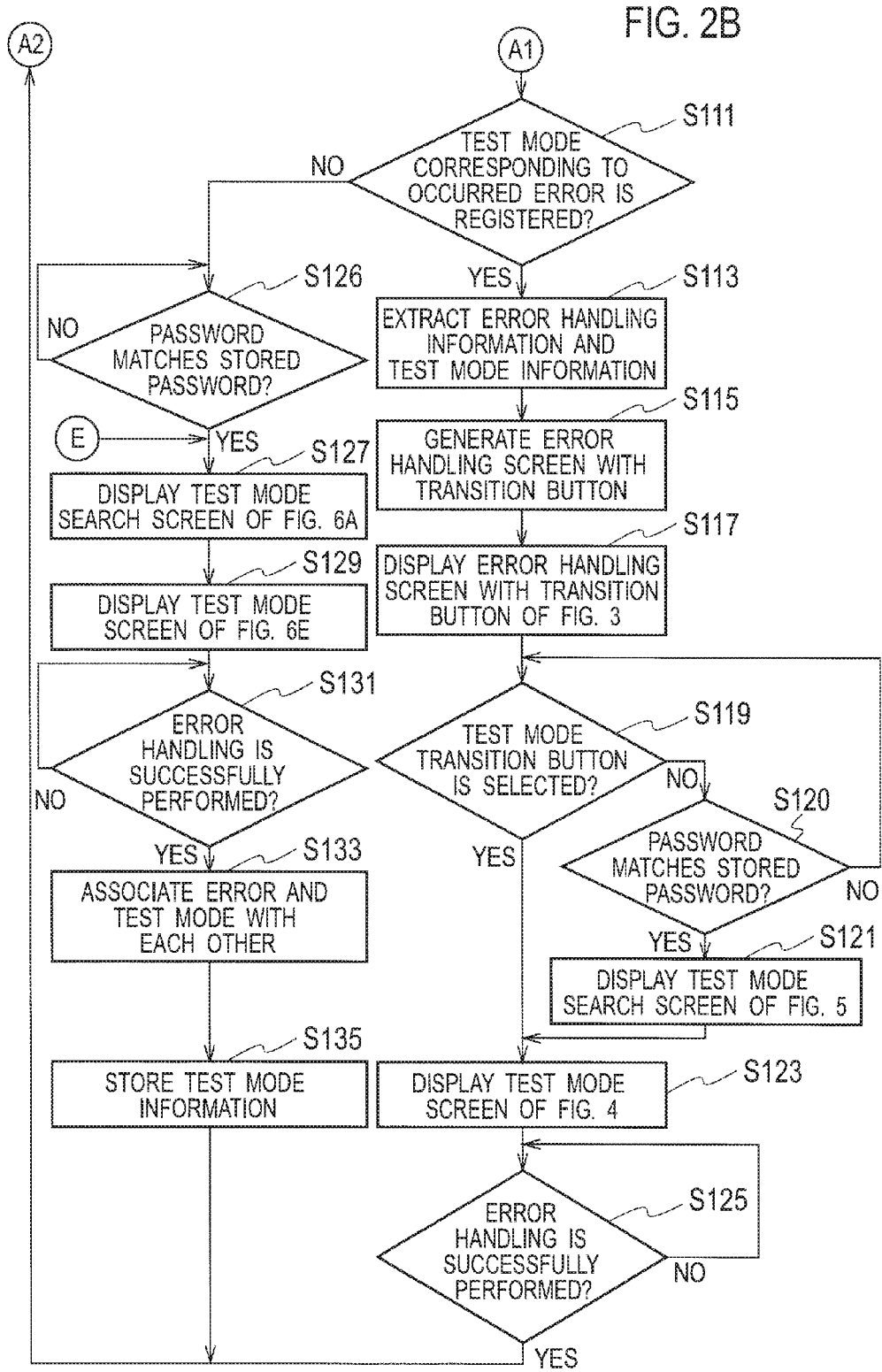

FIGS. 2A and 2B are flowcharts illustrating the operations of the image forming apparatus 1 in Embodiment 1.

First, in the image forming apparatus 1, the user turns on the power switch in the operation unit 11. Then, when the image former 13 receives a print job from any of the terminal devices 3, 3 . . . via the network 2 and the like (step S101; YES), the image former 13 performs image formation by printing images based on the received print job (step S103) under control of the CPU 15. Here, description is given of the example in which the image formation is performed based on a print job from any of the terminal devices 3, 3, . . . for the convenience of description. However, in the present invention, the image formation is not limited to this example and image formation based on, for example, a scan job and a copy job which are generated by the user operating the operation unit 11 and the like may also be performed as a matter of course.

Until the image formation is completed (step S105; NO), the error controller 15a of the CPU 15 performs detection of whether an error occurs in the image forming apparatus 1, based on outputs from the error sensors 14 (step S107). When the image formation is completed without occurrence of an error (step S105; Yes), the CPU 15 terminates the image formation based on this print job.

Meanwhile, when the error controller 15a of the CPU 15 detects occurrence of an error during the printing (step S107; YES), the error controller 15a performs error notification by, for example, displaying an error occurrence screen (not illustrated) indicating occurrence of an error on the display 12 (step S109). Note that the error notification can be performed not only by displaying the error occurrence screen (not illustrated) but also by means of audio or the like.

Next, the error controller 15a of the CPU 15 refers to error management information stored in an error management information storage 17b of the HDD 17, and determines whether a test mode corresponding to the occurred error is registered in the error management information storage 17b (step S111).

In this case, when the test mode corresponding to the occurred error is registered in the error management information storage 17b (step S111; YES), the error controller 15a reads information on the test mode corresponding to the occurred error together with error handling information corresponding to the occurred error, from the error management information storage 17b (step S113).

Next, the error controller 15a of the CPU 15 combines the read error management information and the read test mode information to generate, for example, an error handling screen with a transition button like the one illustrated in FIG. 3 to be described later (step S115), and displays the generated error handling screen with the transition button on the display 12 (step S117).

Figure 3:
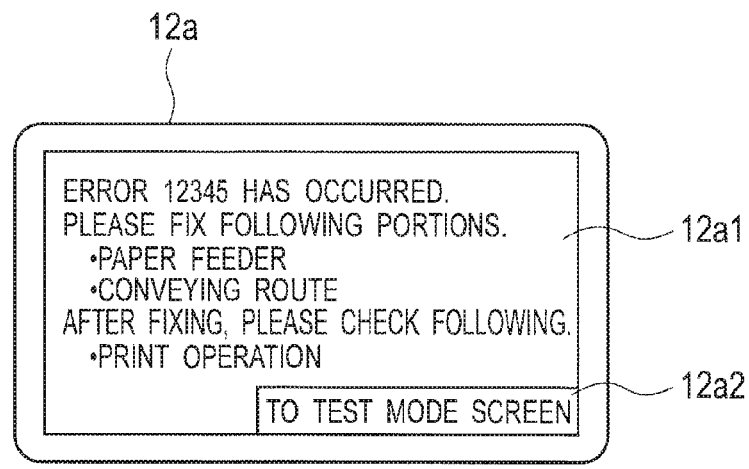
FIG. 3 is a view illustrating an example of an error handling screen with a test mode screen transition button which is displayed on a display by the image forming apparatus in Embodiment 1.

FIG. 3 is a view illustrating an example of the error handling screen 12a with the transition button displayed on the display 12 by the image forming apparatus 1 in Embodiment 1.

As illustrated in FIG. 3, in the error handling screen 12a with the transition button, there is displayed error handling information 12a1 such as "Error 12345 has occurred. Please fix the following portions. •Paper feeder •Conveying route After fixing, please check the following. •Print operation" and a test mode screen transition button 12a2 for transition to a test mode corresponding to the occurred error and the displayed error handling information.

When the user or the service man selects the test mode screen transition button 12a2 in the error handling screen 12a with the transition button like the one illustrated in FIG. 3 (step S119; YES), the error controller 15a of the CPU 15 performs transition from the error handling screen 12a with the transition button like the one illustrated in FIG. 3 to the test mode screen 12b like the one illustrated in FIG. 4, and displays the test mode screen 12b on the display 12 (step S123).

Figure 4:
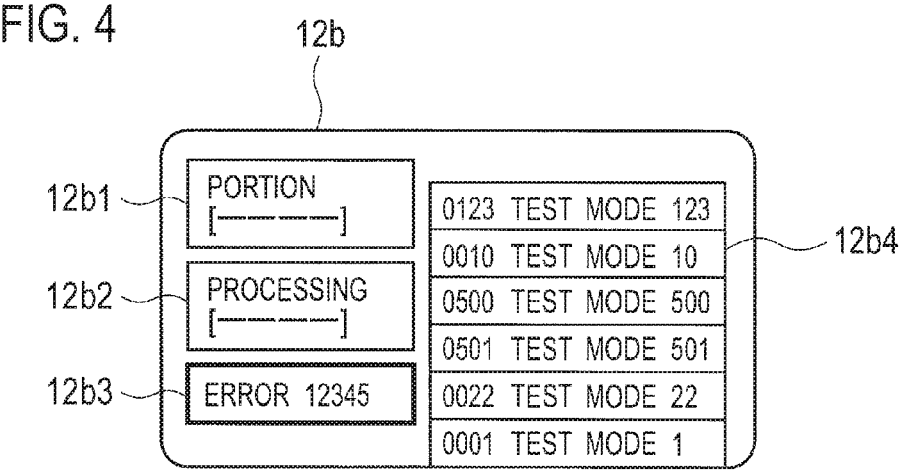
FIG. 4 is a view illustrating an example of a test mode screen which is displayed when the test mode screen transition button of the error handling screen with the transition button is selected in the image forming apparatus in Embodiment 1.

FIG. 4 is a view illustrating an example of the test mode screen 12b which is displayed when the test mode screen transition button 12a2 is selected in the error handling screen 12a with the transition button in the image forming apparatus 1 in Embodiment 1.

As illustrated in FIG. 4, in the test mode screen 12b, there are displayed an error occurrence portion display field 12b1 for displaying a portion where the error has occurred, an error processing display field 12b2 for displaying a content of error processing for the occurred error, an error number display field 12b3 for displaying a number assigned to the occurred error, and a test mode display field 12b4 for displaying one or multiple test modes corresponding to the occurred error.

In the example of FIG. 4, the test mode screen 12b is a screen displayed by selecting the test mode screen transition button 12a2 in the error handling screen 12a with the transition button illustrated in FIG. 3. Accordingly, the "error 12345" which is the number of the occurred and detected error is displayed in the error number display field 12b3 and the occurred error is identified. Moreover, the test modes corresponding to the occurred error are displayed in the test mode display field 12b4. However, no error occurring portion or name of error processing are displayed in the error occurrence portion display field 12b1 and the error processing display field 12b2.

Meanwhile, in order to display the test mode screen 12b of FIG. 4 without the selection of the test mode screen transition button 12a2 in the error handling screen 12a with the transition button in step S119 (NO), the service man or the like uses the operation unit 11 to input a number, a password, or the like (hereafter, collectively referred to as password) which is known only by the service man. When the inputted password matches a password stored in advance (step S120; YES), the test mode search screen 12c like the one illustrated in FIG. 5 to be described later is displayed (step S121). Then, by inputting the error occurrence portion and the error processing in the displayed test mode search screen 12c, there is displayed the test mode screen like the one illustrated in FIG. 4 in which, out of many test modes, the test mode corresponding to the occurred error is identified (step S123).

Figure 5:
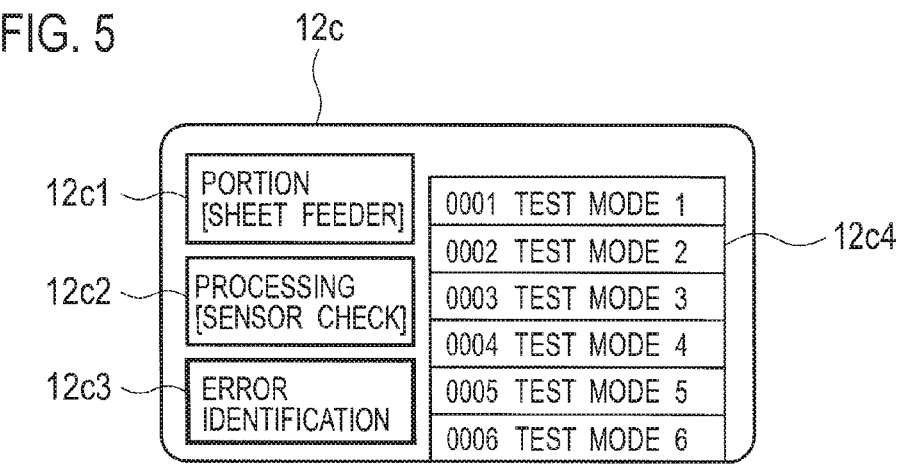
FIG. 5 is a view illustrating an example of a test mode search screen for searching a test mode corresponding to an error which has occurred in the image forming apparatus in Embodiment 1.

FIG. 5 is a view illustrating an example of the test mode search screen 12c for searching a test mode corresponding to an error which has occurred in the image forming apparatus 1 of Embodiment 1.

In the test mode search screen 12c illustrated in FIG. 5, the error occurrence portion display field 12b1 and the error processing display field 12b2 are displayed as in the test mode screen 12b illustrated in FIG. 4. In addition, there are displayed an error identification button 12c3 for transition to the test mode screen 12b of the error identified from the error occurrence portion display field 12b1 and the error processing display field 12b2, and a test mode display field 12c4 in which a list of test modes are displayed in the order of numbers assigned thereto and the like.

After inputting the password or the like for displaying the test mode screen 12b by using the operation unit 11, the service man inputs an error occurrence portion such as "paper feeder" into an error occurrence portion button field 12c1 and also inputs an error processing content such as "error sensor check" into an error processing button field 12c2 in the test mode search screen 12c illustrated in FIG. 5. Thereafter, when the service man selects the error identification button 12c3, there is displayed the test mode screen 12b like the one illustrated in FIG. 4 in which the test mode corresponding to the occurred error is identified.

Then, when the user or the service man executes the test mode by referring to the test mode screen 12b like the one illustrated in FIG. 4 and successfully performs the error handling (step S125; YES), the operation returns to step S103 and the image formation processing is continued.

Meanwhile, the test mode corresponding to the occurred error needs to be found also when no test mode corresponding to the occurred error is registered in the error management information storage 17b in step S111 (NO).

Figure 6A:
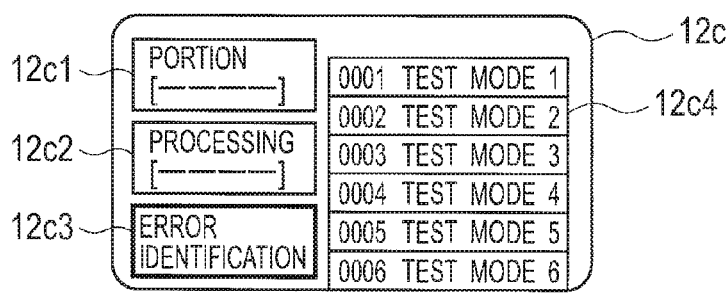
FIGS. 6A to 6E are views illustrating a procedure for displaying the test mode screen illustrated in FIG. 4 from the test mode search screen illustrated in FIG. 5.

In this case, as in step S121 described above, the service man or the like uses the operation unit 11 to input the password known only by the service man. When the inputted password matches the password stored in advance (step S126; YES), the test mode search screen 12c like the one illustrated in FIG. 6A is displayed (step S127). The service man or the like searches for one or multiple test modes corresponding to the occurred error, and the test mode screen 12b like the one illustrated in FIG. 6E is displayed (step S129).

Steps S127 to S129 are described in detail with reference to screen transition views of FIGS. 6A to 6E.

Figure 6B:
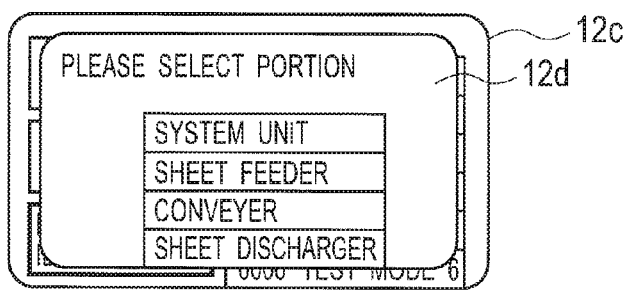

First, as illustrated in FIG. 6A, when the error occurrence portion button field 12c1 is selected in the test mode search screen 12c, an error portion selection window 12d is displayed on the test mode search screen 12c like the one illustrated in FIG. 6B.

Figure 6C:
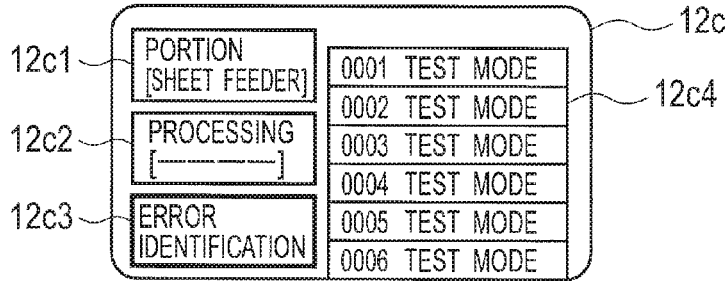

The error portion selection window 12d is a screen for specifying (identifying) the error occurrence portion in the image forming apparatus 1 such as, for example, "system unit," "sheet feeder," "conveyer," and "sheet discharger" as illustrated in FIG. 6B. In this case, for example, when a button of the "sheet feeder" is selected, the "sheet feeder" is displayed in the error occurrence portion button field 12c1 as the error occurrence portion as illustrated in FIG. 6C.

Figure 6D:
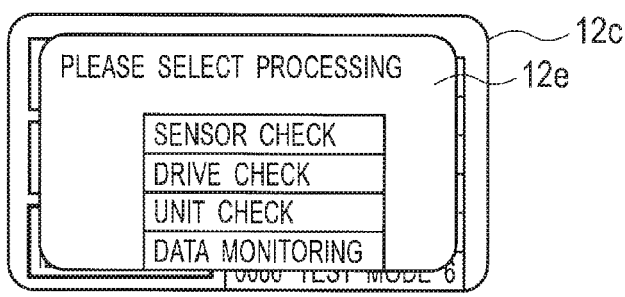
Figure 6E:
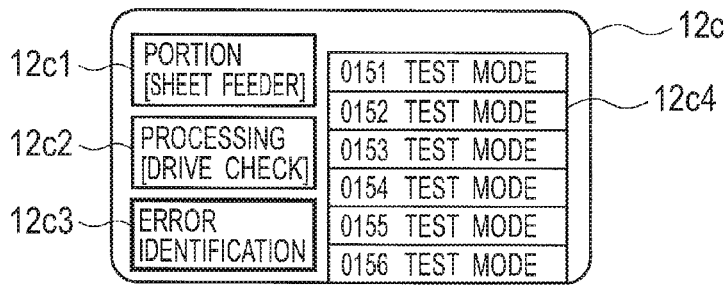

Next, when the error processing button field 12c2 is selected in the test mode search screen 12c, an error processing selection window 12e is displayed on the test mode search screen 12c like the one illustrated in FIG. 6D.

The error processing selection window 12e is a screen for specifying (identifying) the error processing to occur in the image forming apparatus 1 such as "sensor check," "drive check," "unit check," and "data monitor" as illustrated in FIG. 6D. In this case, for example, when a button of the "drive check" is selected, the "drive check" is displayed in the error processing button field 12c2 as the name of the error processing as illustrated in FIG. 6E.

By selecting the error occurrence portion and the error processing in the error occurrence portion button field 12c1 and the error processing button field 12c2 of the test mode search screen 12c as described above, a list of test modes associated with the selected error occurrence portion and the selected error processing are displayed in the test mode display field 12c4.

Next, a test mode is selected out of the many test modes displayed in the test mode display field 12c4 of the test mode search screen 12c illustrated in FIG. 6E, and the selected test mode is executed. Then, when the error handling is successfully performed (step S131; YES), the error controller 15a of the CPU 15 associates the occurred error and the successful test mode with each other (step S133) and stores the error and the test mode in the error management information storage 17b of the HDD 17 as the error management information (step S135).

Specifically, the error number of the occurred error displayed in the error number display field 12b3 and the successful test mode displayed in the test mode display field 12b4 in the test mode screen 12b illustrated in FIG. 4 are stored in association with each other. Moreover, the error handling information of the occurred error which is displayed in the error occurrence portion display field 12b1 and the error processing display field 12b2 or which is displayed in the error occurrence portion button field 12c1 and the error processing button field 12c2 of the test mode search screen 12c illustrated in FIG. 5 may also be stored in association with the error number and the test mode.

Thereafter, the error controller 15a of the CPU 15 causes the operation to return to the image formation processing of step S103. Note that, when the error handling fails in step S131 (NO), the processing of step S131 is repeatedly executed until the error handling is successfully performed.

Due to this, when the same error occurs again, since the test mode corresponding to the occurred error is registered in the error management information storage 17b, the error controller 15a of the CPU 15 determines "YES" in the determination processing of step S111, and the processing of step S113 and the following steps described above is executed.

As described above, when an error occurs in the situation where a test mode corresponding to the occurred error is registered in the error management information storage 17b, the image forming apparatus 1 in Embodiment 1 reads the error handling information and the test mode which correspond to the occurred error, and displays the error handling screen 12a with the transition button displaying the test mode screen transition button 12a2.

Accordingly, the user or the service man does not have to input the error occurrence portion, the error processing, and the like in the test mode search screen 12c like the one illustrated in FIG. 5 and find the test mode corresponding to the occurred error out of many test modes. Hence, the user or the service man can easily identify the test mode corresponding to the occurred error and handle the error.

Moreover, if the test mode corresponding to the occurred error is not registered in the error management information storage 17b, the test mode corresponding to the occurred error is identified in the test mode search screen 12c illustrated in FIGS. 6A to 6E. Then, after the completion of the error handling, the occurred error, the error handling information, and the test mode are stored in association with one another as the error management information.

Accordingly, when the same error occurs again later, the error handling screen 12a with the transition button is generated and displayed based on the error management information of this error. Hence, the user or the service man can easily identify the test mode corresponding to the occurred error and handle the error.

Embodiment 2

In the description of the image forming apparatus 1 in Embodiment 1, the person who executes the error handling is described regardless of whether the person is the user or the service man. However, there are errors which should be handled only by the service man and errors which can be handled not only by the service man but also by the user, depending on contents of the errors. Moreover, a case is conceivable where error handling performed by the user should rather be performed only by the service man, depending on a failure rate of the error handling and a frequency of error occurrence.

In view of this, the image forming apparatus 1 in Embodiment 2 is characterized in that a flag indicating whether error handling can be executed by both the service man and the user or can be executed only by the service man is set for each error in addition to the error handling information of the error, and the flag is rewritten depending on the number of times the user has desired to perform the error handling, the number of times of error occurrence (error frequency), and the failure rate of the error handling.

The image forming apparatus 1 in Embodiment 2 thus has the same configuration as the image forming apparatus 1 in Embodiment 1 illustrated in FIG. 1, different only in the function of the error controller 15*a* of the CPU 15. Accordingly, operations of the image forming apparatus 1 in Embodiment 2 are described with reference to the configuration of the image forming apparatus 1 illustrated in FIG. 1.

Figure 7:
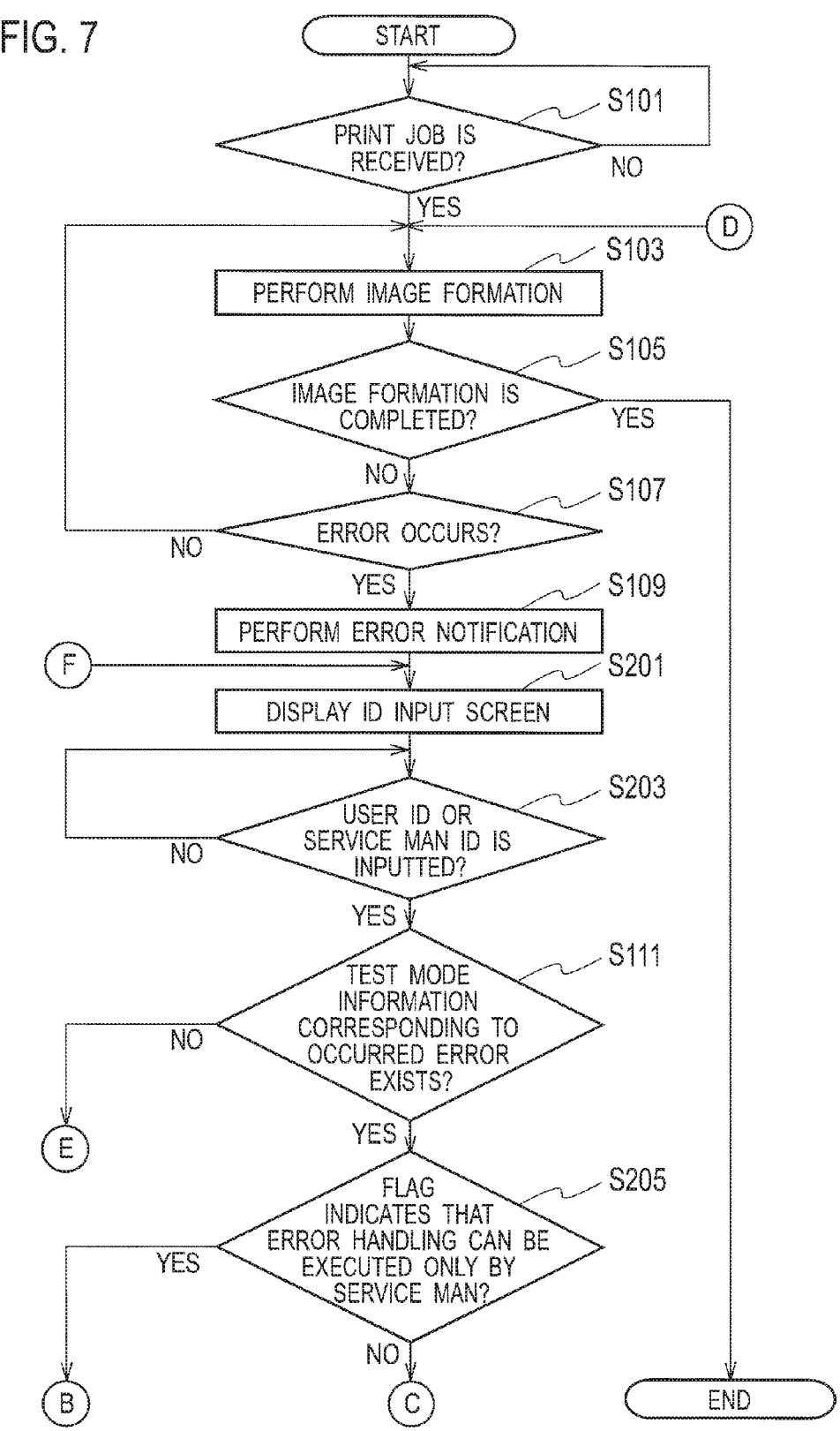
FIG. 7 is a flowchart illustrating operations of the image forming apparatus in Embodiment 2 of the present invention.

FIG. 7 is a flowchart illustrating the operations of the image forming apparatus 1 in Embodiment 2. Note that the same processing steps as that in the flowcharts of the image forming apparatus 1 in Embodiment 1 illustrated in FIGS. 2A and 2B are described while being denoted by the same step numbers.

As illustrated in FIG. 7, in the image forming apparatus 1 in Embodiment 2, the processing up to step S109 is the same as the processing in the image forming apparatus 1 in Embodiment 1 illustrated in FIG. 2A. Specifically, when the user turns on the power switch in the operation unit 11 and the image forming apparatus 1 receives a print job from any of the terminal devices 3, 3, . . . (step S101; YES), the image former 13 performs printing based on the received print job under the control of the CPU 15 (step S103).

Then, until the image formation is completed (step S105; YES), the error controller 15*a* of the CPU 15 performs detection of whether an error occurs, based on the outputs from the error sensors 14 (step S107). When the image formation is completed without occurrence of an error, the image formation based on this print job is completed.

Meanwhile, when the error controller 15*a* of the CPU 15 detects occurrence of an error based on the outputs from the error sensors 14 (step S107; YES) before the completion of the image formation (step S105; NO), the error controller 15*a* performs the error notification by, for example, displaying the error occurrence screen (not illustrated) on the display 12 (step S109). Note that the processing up to this point is the same as that in the image forming apparatus 1 in Embodiment 1.

Next, the error controller 15*a* of the CPU 15 in Embodiment 2 displays an ID input screen (not illustrated) for inputting a user ID or a service man ID on the display 12 (step S201), and determines whether the user or the service man inputs the user ID or the service man ID (step S203).

Then, when the user ID or the service man ID is inputted in the ID input screen (not illustrated) (step S203; YES), the error controller 15*a* of the CPU 15 in Embodiment 2 refers to the error management information stored in the error management information storage 17*b* of the HDD 17, and determines whether a test mode corresponding to the occurred error is registered in the error management information storage 17*b* (step S111).

In this case, when the test mode corresponding to the occurred error is not registered in the error management information storage 17*b* (step S111; NO), the error controller 15*a* of the CPU 15 in Embodiment 2 causes the operation to proceed to the processing of step S127 in FIG. 2B as in the image forming apparatus 1 in Embodiment 1.

Meanwhile, when the test mode corresponding to the occurred error is determined to be registered in the error management information storage 17*b* in step S111 (YES), the error controller 15*a* of the CPU 15 in Embodiment 2 determines whether a flag set for error handling information of the occurred error indicates that error handling can be executed only by the service man (step S205). Note that the flag may be set directly for each error, instead of being set for the error handling information corresponding to the error.

Then, when the flag set for the error handling information of the occurred error indicates that the error handling can be executed only by the service man (step S205; YES), the operation proceeds to the flowchart illustrated in FIG. 8. Meanwhile, when the flag indicates that the error handling can be executed not only by the service man but by both the service man and the user (step S205; NO), the operation proceeds to the flowchart illustrated in FIG. 9.

Figure 8:
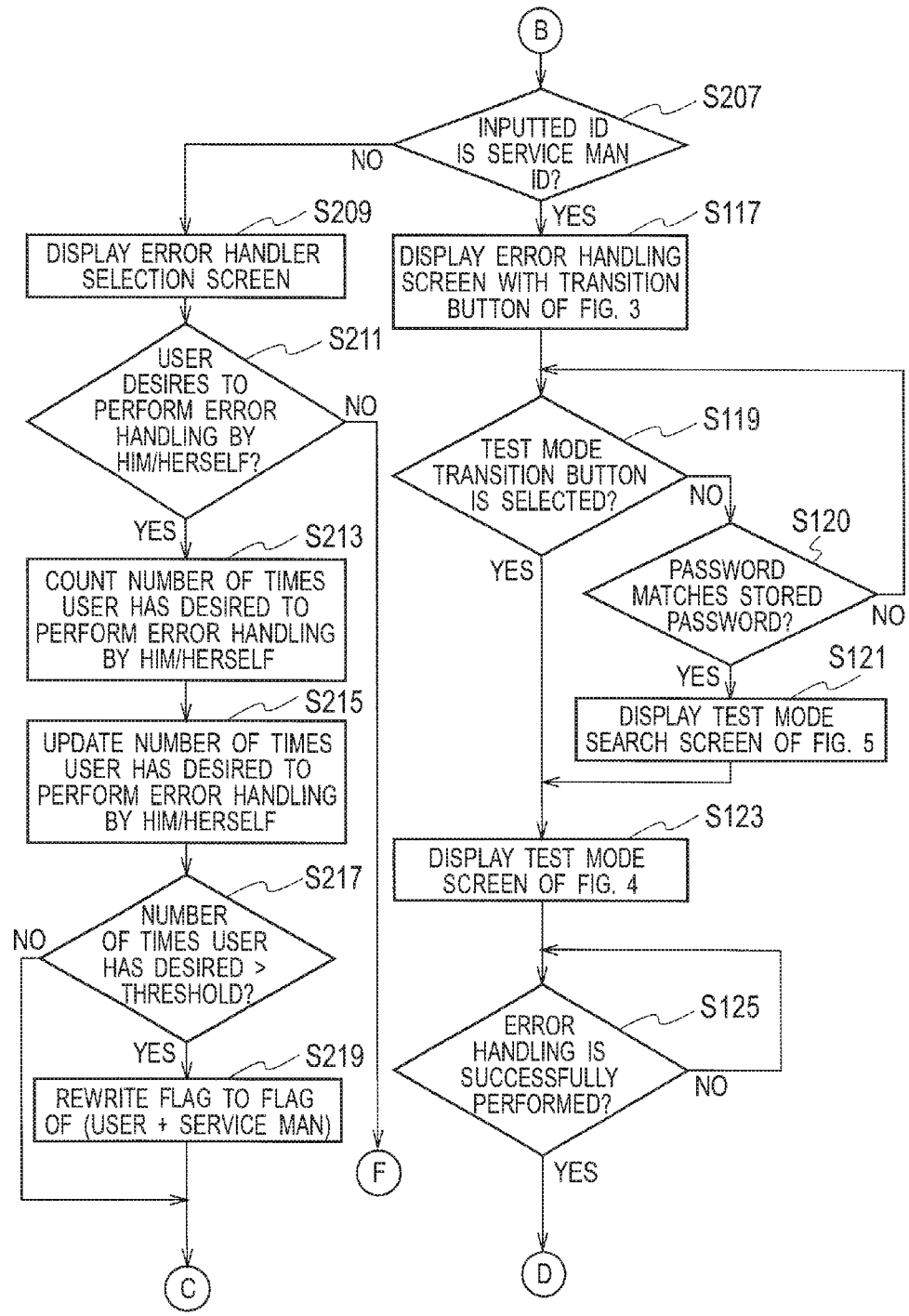
FIG. 8 is continuation of the flowchart in FIG. 7 illustrating the operations of the image forming apparatus, and is a flowchart in the situation where a flag indicates that error handling can be executed only by a service man.

Case where Flag Indicates that Error Handling can be Executed Only by Service Man FIG. 8 is a flowchart illustrating processing performed when the flag set for the error handling information of the occurred error indicates that the error handling can be executed only by the service man. In the processing of FIG. 8, since the flag indicates that the error handling can be executed only by the service man, the error handling is executed only by the service man.

Specifically, when the flag set for the error handling information indicates that the error handling can be executed only by the service man (step S205; YES), the error controller 15*a* of the CPU 15 in Embodiment 2 first determines whether the ID inputted in the ID input processing of step S203 is the service man ID (step S207).

The ID inputted in step S203 being the service man ID (step S207; YES) means that the service man is executing the error handling. Accordingly, the error controller 15*a* of the CPU 15 in Embodiment 2 displays the error handling screen 12*a* with the transition button (see FIG. 3) (step S117). When the test mode screen transition button 12*a*2 is selected in the error handling screen 12*a* with the transition button (step S119; YES), the error controller 15*a* of the CPU 15 in Embodiment 2 performs transition from the error handling screen 12*a* with the transition button (see FIG. 3) to the test mode screen 12*b* (see FIG. 4), and displays the test mode screen 12*b* on the display 12 (step S123).

In order to display the test mode screen 12*b* (see FIG. 4) on the display 12 without the selection of the test mode screen transition button 12*a*2 (step S119; NO), the following operations are required. First, a password is inputted and matched (step S120; YES), then the test mode search screen 12*c* like the one illustrated in FIG. 5 is displayed on the display 12 (step S121), and a test mode corresponding to the occurred error is identified from the error occurrence portion, the error processing, and the like and displayed. This is cumbersome and takes time.

When the service man executes the test mode while referring to the test mode screen 12b (see FIG. 4) and successfully performs the error handling (step S125; YES), the operation returns to the image formation processing of step S103.

As described above, when an error occurs in a situation where the flag indicating that the error handling is to be executed only by the service man is set for the error handling information of the occurred error, the image forming apparatus 1 displays, on the display 12, the error handling screen 12a with the transition button displaying the test mode screen transition button 12a2, only if the inputted ID is the service man ID.

Accordingly, there is no need to display the test mode search screen 12c like the one illustrated in FIG. 5 on the display 12 (step S121) and find the test mode corresponding to the occurred error out of the many test modes. Hence, the service man can easily identify the test mode corresponding to the occurred error and handle the error.

Meanwhile, when the ID inputted in step S203 is not an service man ID (step S207; NO), the person who is trying to execute the error handling is a person other than the service man such as the user, although the flag indicating that the error handling can be executed only by the service man is set for the occurred error.

In this case, the error controller 15a of the CPU 15 in Embodiment 2 displays, on the display 12, an error handler selection screen (not illustrated) which, for example, makes the user or the like choose whether to perform the error handling by him/herself or to call the service man and request the error handling (step S209), and make the user or the like choose the person to perform the error handling (step S211).

In this case, when the user desires to perform the error handling by him/herself and chooses the error handling by him/herself while referring to the error handler selection screen (not illustrated) (step S211; YES), the error controller 15a of the CPU 15 of Embodiment 2 counts the number of times the user has desired to perform the error handling by him/herself (step S213), and updates and stores the number in the memory 16 or the like (step S215).

Next, the error controller 15a of the CPU 15 in Embodiment 2 determines whether the number of times the user has desired to perform the error handling by him/herself is greater than a predetermined threshold (step S217). The error controller 15a rewrites the flag for this error handling to the flag indicating that the error handling can be executed by both the service man and the user (step S219), provided that the number of times the user has desired to perform the error handling by him/herself is greater than the predetermined threshold (step S217; YES).

After that, or also in the case where the number of times the user has desired to perform the error handling by him/herself is equal to or less than the predetermined threshold (step S217; NO), the operation proceeds to the flowchart of FIG. 9, and the user executes the error handling by him/herself.

Accordingly, when the flag set for a certain error indicates that the error handling can be executed only by the service man (step S205; YES) but the user desires to perform the error handling by him/herself and the number of times the user has desired to perform the error handling exceeds the predetermined threshold (step S217; YES), the flag set for the certain error is rewritten to the flag indicating that the error handling can be executed by both the service man and the user in the flag rewriting processing of step S219. Thus, when the same error occurs later, the operation proceeds to the flowchart of FIG. 9 and the user can also execute the error handling.

Meanwhile, when the user desires that the error handling is to be performed by the service man in the determination processing of step S211 (step S211; NO), the operation returns to the ID input screen display processing of step S201 in FIG. 7, and the user lets the service man input the service man ID and perform the error handling.

Since the service man ID is inputted in this case, the determination result is "YES" in the determination processing of step S207, and the service man executes the processing of steps S117 and the following steps and performs the error handling.

Figure 9:
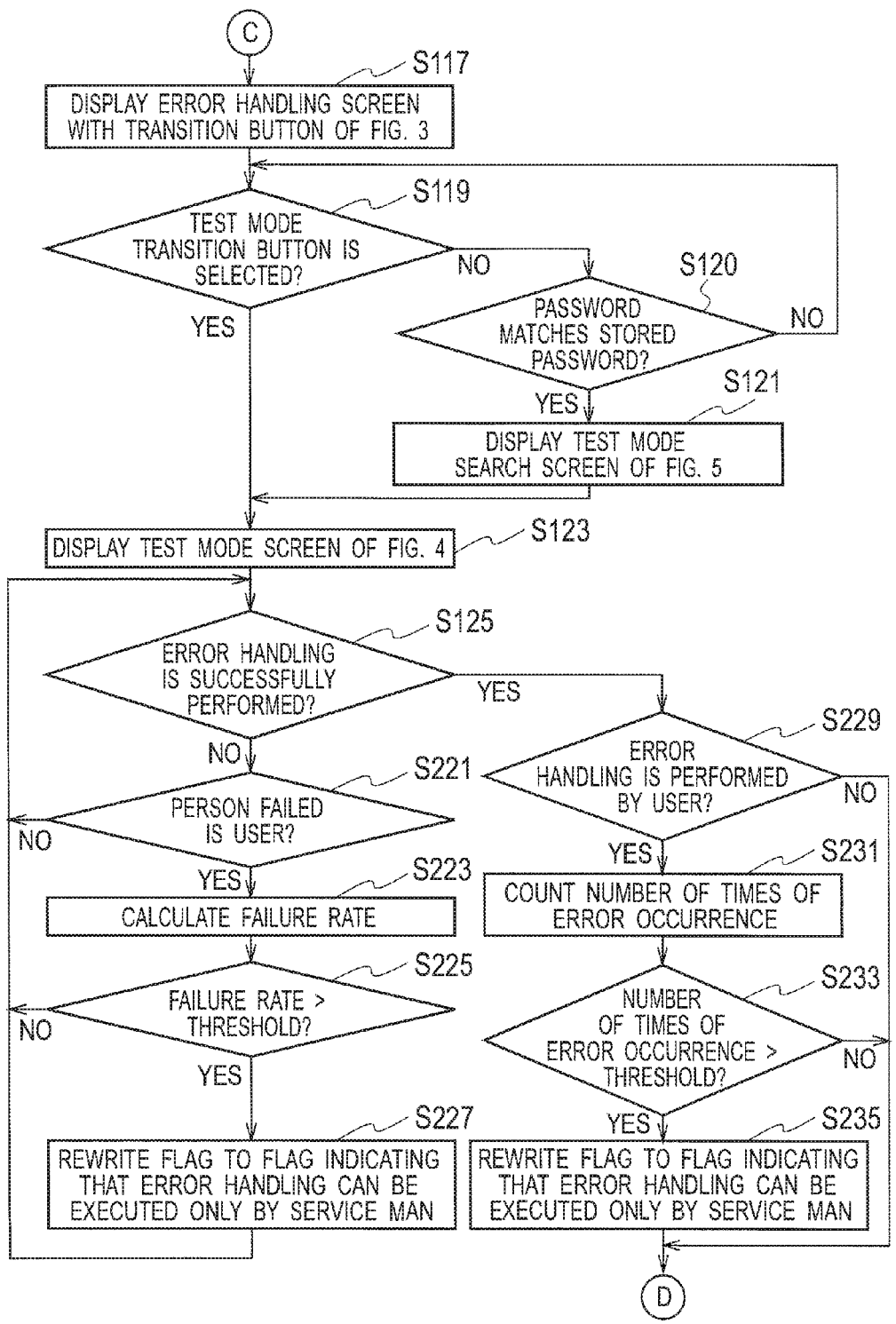
FIG. 9 is continuation of the flowchart in FIG. 7 illustrating the operations of the image forming apparatus, and is a flowchart in the situation where the flag indicates that the error handling can be executed by both the service man and a user.

Case where Flag Indicates that Error Handling can be Executed by Both Service Man and User FIG. 9 is a flowchart illustrating processing performed when the flag set for the error handling information of the occurred error indicates that the error handling can be executed by both the service man and the user. In the processing of FIG. 9, the service man and the user execute the error handling.

When the flag set for the error handling information of the occurred error indicates that the error handling can be executed by both the service man and the user in the determination processing of step S205 in FIG. 7 (step S205; NO), the error controller 15a of the CPU 15 in Embodiment 2 displays the error handling screen 12a with the transition button (see FIG. 3) as illustrated in FIG. 9 (step S117).

Then, when the user or the service man selects the test mode screen transition button 12a2 while referring to the error handling screen 12a with the transition button (see FIG. 3) (step S119; YES), the error controller 15a of the CPU 15 in Embodiment 2 performs switching from the error handling screen 12a with the transition button (see FIG. 3) to the test mode screen 12b (see FIG. 4) displaying a test mode corresponding the occurred error, and displays the test mode screen 12b (step S123).

In this case, the user or the service man can skip the processing of step S121 in which the test mode search screen 12c like the one illustrated in FIG. 5 is displayed on the display 12 and the user or the service man finds the test mode corresponding to the occurred error out of the many test modes in the test mode search screen 12c. Accordingly, the user or the service man can easily identify the test mode corresponding to the occurred error and handle the error.

Meanwhile, when the test mode screen transition button 12a2 is not selected in the error handling screen 12a with the transition button in step S119 (NO) and the password matching the password stored in advance is inputted (step S120; YES), the error controller 15a of the CPU 15 in Embodiment 2 displays the test mode search screen 12c like the one illustrated in FIG. 5 (step S121). The error controller 15a thereby makes the user or the service man find the test mode corresponding to the occurred error out of the many test modes, and displays the test mode screen like the one illustrated in FIG. 4 (step S123).

Next, in the processing of FIG. 9, since the error handling is executed not only by the service man but also by the user unlike in FIG. 8, the following operation is performed. When the user or the service man fails to perform the error handling of the test mode (step S125; NO), the error controller 15a of the CPU 15 in Embodiment 2 determines whether a person failed to perform the error handling is the user (step S221). Note that the fact of failure is inputted by the user.

Then, the error controller 15a of the CPU 15 in Embodiment 2 calculates the failure rate (step S223) and stores the failure rate in the memory 16 or the like, provided that the person failed to perform the error handling is the user (step S221; YES). The failure rate is obtained by, for example, dividing the number of times of error handling failure by the number of times of performing the error handling. Moreover, instead of calculating the failure rate, it is possible to compare the number of times of error handling failure with a predetermined threshold and determine whether the number of times of error handling failure is greater than the predetermined threshold.

Then, the error controller 15a of the CPU 15 in Embodiment 2 determines whether the failure rate of the error handling is greater than a predetermined threshold such as, for example, 80% (step S225). The error controller 15a rewrites the flag indicating that the error handling can be executed by both the service man and the user to the flag indicating that the error handling can be executed only by the service man (step S227), provided that the failure rate of the error handling is greater than the predetermined threshold (step S225; YES).

As described above, when the failure rate of the error handling by the user is greater than the predetermined threshold, the flag is rewritten to the flag indicating that the error handling can be executed only by the service man in the processing of step S227. Accordingly, when the same error occurs later, the service man executes the error handling and the error handling can be thus executed efficiently.

Meanwhile, when the person failed to perform the error handling is determined to be the service man (step S221; NO) or when the user fails to perform the error handling (step S221; YES) but the failure rate of the error handling is equal to or less than the predetermined threshold (step S225; NO), the rewriting of the flag in step S227 is not executed and the flag is left be the flag indicating that the error handling can be executed by both the service man and the user.

Then, when the service man or the user successfully performs the error handling (step S125; YES), the error controller 15a of the CPU 15 in Embodiment 2 determines whether the error handling is performed by the user (step S229).

In this case, when the person executing the error handling is the user (step S229; YES), the error controller 15a of the CPU 15 in Embodiment 2 counts the number of times of error occurrence (step S231) and determines whether the number of times of error occurrence (error frequency) is greater than a predetermined threshold (step S233). Then, the error controller 15a rewrites the flag to the flag indicating that the error handling can be executed only by the service man (step S235), provided that the number of times of error occurrence is greater than the predetermined threshold such as, for example, 10 (YES). Then, the operation proceeds to the image formation processing of step S103 illustrated in FIG. 7.

Specifically, when the error handling for a certain error is executed by the user and the number of times of occurrence of this error is greater than the predetermined threshold, it is likely that the error handling by the user is insufficient because the same error occurs repeatedly or that a part in a portion where the error has occurred has reached the end of life and the same error occurs repeatedly. The flag of the error is thus rewritten to the flag indicating that the error handling can be executed only by the service man in the processing of step S229. Accordingly, when the same error occurs later, the service man executes the error handling, and the error handling or part replacement can be efficiently performed by the service man.

Meanwhile, when the person performing the error handling is not the user but the service man (step S221; NO) or when the number of times of error occurrence (error frequency) is less than the predetermined threshold (step S233; NO), the error controller 15a of the CPU 15 in Embodiment 2 does not execute the rewriting processing of the flag in step S235, and the flag is left to be the flag indicating that the error handling can be executed by both the service man and the user.

Accordingly, when an error occurs in the situation where a test mode corresponding to the occurred error is registered in the error management information storage 17b, the image forming apparatus 1 in Embodiment 2, like the image forming apparatus 1 in Embodiment 1, reads the error handling information and the test mode which correspond to the occurred error, and displays the error handling screen 12a with the transition button (see FIG. 3). Thus, by selecting the test mode screen transition button 12a2 in the error handling screen 12a with the transition button (see FIG. 3), the test mode screen 12b (see FIG. 4) displaying test modes corresponding to the occurred error can be displayed. Hence, the user or the service man can easily identify the test mode corresponding to the occurred error and handle the error.

Moreover, after an error occurs in the situation where the flag corresponding to this error indicates that the error handling is to be executed only by the service man, the image forming apparatus 1 in Embodiment 2 displays, on the display 12, the error handling screen 12a with the transition button displaying the test mode screen transition button 12a2, only if the inputted ID is the service man ID. Accordingly, in this case, the service man can easily identify a test mode corresponding to the occurred error out of many test modes by selecting the test mode screen transition button 12a2 in the error handling screen 12a with the transition button, and perform the error handling.

Furthermore, when an error occurs and then the user fails in error handling in the case where the flag corresponding to this error indicates that the error handling can be executed by both the service man and the user, the image forming apparatus 1 in Embodiment 2 calculates the failure rate of the error handling. When the failure rate of the error handling exceeds the predetermined threshold, the flag is rewritten to the flag indicating that the error handling can be executed only by the service man. Since the error handling is hereafter set as the error handling which can be executed only by the service man in this case, the error handling is efficiently executed based on the failure rate of the error handling.

Moreover, when an error occurs and then the user successfully performs the error handling in the case where the flag corresponding to this error indicates that the error handling can be executed by both the service man and the user, the image forming apparatus 1 in Embodiment 2 counts the number of times of error occurrence. When the number of times of error occurrence is greater than the predetermined threshold, the flag is rewritten to the flag indicating that the error handling can be executed only by the service man. In this case, it is likely that the error handling by the user is insufficient because the same error occurs repeatedly or that a part in a portion where the error has occurred has reached the end of life and the same error occurs repeatedly.

Thus, rewriting the flag to the flag indicating that the error handling can be executed only by the service man allows the service man to efficiently perform the error handling or execute part replacement when the same error occurs later.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An image forming apparatus that forms an image on a recording medium based on a print data, the image forming apparatus comprising:
   an error detector configured to detect an error occurring in the image forming apparatus;
   a storage configured to store pieces of error handling information and test modes in association with each other, each of the pieces of error handling information indicating a method of error handling for each of errors occurring in the image forming apparatus, the test modes to be executed during the error handling; and
   an error controller configured to read, from the storage, the piece of error handling information and one or more of the test modes corresponding to an error detected by the error detector, generate an error handling screen including the read piece of error handling information and a transition button for transition to a test mode list screen for displaying a list of the read one or more of the test modes, and display the generated error handling screen on a display,
   wherein the error handling information includes a flag indicating whether the error handling is executable only by a service man or by both the service man and a user, the error controller is configured to
      read, from the storage, the error handling information and the one or more of the test modes corresponding to the error detected by the error detector and display an ID input screen for inputting a user ID or a service man ID on the display,
      upon the flag included in the read error handling information indicating that the error handling is executable only by the service man and only upon an ID inputted into the ID input screen being the service man ID, generate the error handling screen based on the read error handling information and the read one or more of the test modes and display the generated error handling screen on the display, and
      upon the flag included in the read error handling information indicating that the error handling is executable by both the service man and the user and upon the ID inputted into the ID input screen being any of the user ID and the service man ID, generate the error handling screen based on the read error handling information and the read one or more of the test modes and display the generated error handling screen on the display.

2. The image forming apparatus according to claim 1, wherein, upon the flag included in the read error handling information indicating that the error handling is executable by both the service man and the user and upon failure of the error handling performed by an operation of the user referring to the error handling screen displayed on the display, the error controller calculates a failure rate of the error handling and rewrites the flag of the error handling whose calculated failure rate exceeds a threshold, to the flag indicating that the error handling is executable only by the service man.

3. An image forming apparatus that forms an image on a recording medium based on a print data, the image forming apparatus comprising:
   an error detector configured to detect an error occurring in the image forming apparatus;
   a storage configured to store pieces of error handling information and test modes in association with each other, each of the pieces of error handling information indicating a method of error handling for each of errors occurring in the image forming apparatus, the test modes to be executed during the error handling; and
   an error controller configured to read, from the storage, the piece of error handling information and one or more of the test modes corresponding to an error detected by the error detector, generate an error handling screen including the read piece of error handling information and a transition button for transition to a test mode list screen for displaying a list of the read one or more of the test modes, and display the generated error handling screen on a display,
   wherein the error handling information includes a flag indicating whether the error handling is executable only by a service man or by both the service man and a user, and
   wherein, upon the flag included in the read error handling information indicating that the error handling is executable by both the service man and the user and upon failure of the error handling performed by an operation of the user referring to the error handling screen displayed on the display, the error controller calculates a failure rate of the error handling and rewrites the flag of the error handling whose calculated failure rate exceeds a threshold, to the flag indicating that the error handling is executable only by the service man.

* * * * *